United States Patent [19]

Mancosu et al.

[11] Patent Number: 5,668,731
[45] Date of Patent: Sep. 16, 1997

[54] METHOD AND APPARATUS FOR PLOTTING A TRACE PATTERN ON THE TREAD BAND OF A TIRE

[75] Inventors: Federico Mancosu; Alessandro Volpi, both of Milan, Italy

[73] Assignee: Pirelli Coordinamento Pneumatici S.p.A., Milan, Italy

[21] Appl. No.: 393,471

[22] Filed: Feb. 24, 1995

[30] Foreign Application Priority Data

Feb. 24, 1994 [IT] Italy ................ MI94A0334 U

[51] Int. Cl.$^6$ ................ G06F 19/00; B23K 26/00
[52] U.S. Cl. ................ 364/474.08; 157/13; 219/121.68; 219/121.69
[58] Field of Search ............ 364/474.08, 167.01, 364/474.05, 474.24, 551.01, 560; 219/121.6, 121.68, 121.69, 121.83, 121.85, 121.79, 121.8, 121.81; 157/13; 347/110, 224, 225; 395/103

[56] References Cited

U.S. PATENT DOCUMENTS

| 2,704,122 | 3/1955 | Watson | 164/10.2 |
|---|---|---|---|
| 2,863,507 | 12/1958 | Meserve et al. | 164/10.2 |
| 3,562,715 | 2/1971 | Bishop et al. | 364/474.18 |
| 4,469,930 | 9/1984 | Takahashi | 364/193 X |
| 4,564,737 | 1/1986 | Burke et al. | 219/121.68 |
| 4,782,881 | 11/1988 | Brinkley et al. | 157/13 |
| 4,906,813 | 3/1990 | Gajdos | 219/121.68 |
| 5,239,158 | 8/1993 | Locklear et al. | 219/121.69 |

FOREIGN PATENT DOCUMENTS

| 1157103 | 11/1983 | Canada. |
|---|---|---|
| 59-070553 | 4/1984 | Japan. |
| WO8001549 | 8/1980 | WIPO. |

*Primary Examiner*—Joseph Ruggiero
*Attorney, Agent, or Firm*—Watson Cole Stevens Davis, P.L.L.C.

[57] ABSTRACT

An apparatus for plotting a tread pattern on a vulcanized tire (2) which is mounted to a rim (7) rotatably supported by a primary framework (5) and oscillatable about two axes (Z, X) perpendicular to each other and to the axis of rotation (Y) of the tire (2). A signal from an electronic computer into which a base data sequence relating to a trace pattern to be reproduced on the tire is stored, is fed with a detection data sequence relating to the surface extension of said tire. The base data are processed depending on the detection data sequence for creating an application data sequence, so that, based on said application data, the electronic computer operates a laser beam emitter (10) carrying out plotting of the required trace pattern on the outer surface of the tire, as the sum of subsequent distinct portions, each of them being plotted, while the tire is stationary, through oscillations of the laser beam within a cone of predetermined width.

17 Claims, 1 Drawing Sheet

METHOD AND APPARATUS FOR PLOTTING A TRACE PATTERN ON THE TREAD BAND OF A TIRE

BACKGROUND OF THE INVENTION

The present invention relates to a method and an apparatus for plotting a trace pattern on the tread band of a tire especially when making a prototype tire for subsequent testing.

In greater detail, the method and apparatus of the present invention are designed to execute the plotting of a trace pattern on vulcanized tires the tread band of which, first smooth, must be submitted to a so-called "gouging" working adapted to produce grooves and cuts suitably oriented according to a predetermined pattern.

It is known that a gouging operation, generally carried out on small sampling tires intended for control tests or other particular uses, comprises manually forming by a tool essentially made of a suitably shaped and heated blade, a plurality of cuts and grooves having appropriate width, depth and orientation features, so as to form grooves or furrows in the tread band itself according to a specific pattern, usually referred to as "tread pattern".

In order that an operator may carry out cuts and grooves on the tread band according to the exact pattern as previously defined, it is necessary that plotting of the path to be then followed be first executed on the tread band.

The assembly of the marks relating to cuts and grooves substantially defines a two-dimension pattern on the tread surface which is usually referred to as "trace pattern" in order to distinguish it from the three-dimension tread pattern generated by the actual presence of said cuts and grooves (imprint or track pattern).

Presently, plotting of the trace pattern on the tread band is usually carried out by a painting operation executed on an inflated tire through appropriate masks of a metal sheet cut according to the pattern to be reproduced. Generally, a mask used for plotting a trace pattern is so sized that it covers the whole tread band axial width and the sidewall portions that may extend as far as the maximum carcass width of the tire along a circumferential portion equal to a submultiple integer of the overall circumferential extension.

The pattern plotting is thus carried out on consecutive circumferential sectors and for the execution of same, therefore, the mask must be each time positioned exactly in coincidence with the end portion of the previously plotted sector. In carrying out this positioning operation the greatest care must be taken, in that possible inaccuracies could lead to the impossibility of making the end of the last sector to be plotted fit the start portion of the first sector previously plotted.

Often a perfect matching of said ends is impaired in that unavoidably the circumferential extension of the tread band is indeterminate and imprecise as the tolerance field of said extension generally involves a few millimeter deviation from the nominal value.

In addition it will be recognized that in carrying out cut workings in the metal sheet for preparing the mask it is to be taken into account the fact that the geometrical features of the pattern formed therein will be subjected to modifications when the mask itself, first extended in a flat plane, must be adapted to the curved conformation of the tread band, which, as known, is bent in two directions at right angles to each other, that is, the axial and circumferential directions.

In other words, the cutting operation of the mask must be executed according to a flat extension of the trace pattern to be plotted on the tread band.

In view of the above, making cuts adjacent to the side edges of the tread band is particularly critical. In fact, at said areas important deformations are likely because of the necessity to bend the metal sheet forming the mask according to a substantially radial orientation on the tire sidewall. In order to meet this requirement, the side portions of the metal sheet are divided into a plurality of ribbon-like portions disposed consecutively in side by side relation, which portions will be partly overlapped when the mask is fitted to the tire conformation.

In addition said slits in the mask cannot be made such as to exactly mate the trace pattern to be reproduced. In particular, it is impossible to make slit combinations extending according to an endless line from one end of the pattern to the other, in that this would cause the mask to be divided into a great number of small pieces. It is therefore necessary that the slit extension be suitably interrupted for enabling the different mask portions defined by the slits themselves to be kept conveniently linked to each other. Therefore the interruption stretches of the slits arranged on purpose must be conveniently identified in the trace pattern produced on the tread band, so that the operator designated to carry out gouging may be able to distinguish them from other possible interruptions that on the contrary must be really reproduced to carry out the tread pattern.

Attempts have been made to overcome said difficulties by directly furrowing the vulcanized tire surface without the aid of guide masks: for example, in Canadian Patent No. 1,157, 103 a laser beam is used for forming a plurality of slits and grooves on the outer tire surface, on the tread or sidewalls, which are adapted to define a tread pattern or identification elements for the tire, respectively.

In order to achieve the above objective, the tire, rotating about its own axis, is mounted to a support moving according to three Cartesian axes: the groove and cut shape and depth are obtained by controlling the support movements so as to adjust the fixed position of the focal point of the laser to the surface portion of the tire to be worked.

Such a solution however has not solved the problem in a satisfactory manner; the relative movement between the laser and tire surface only extends along said Cartesian axes and about the rotational axis of the tire so that only substantially flat surfaces can be worked; in other words, only the tire tread band and sidewall can be worked in separate steps and alternately. On the contrary, working of the tire shoulder, that is the curved interconnection portion between the sidewall and tread end is either impossible, or very difficult and the results are poor.

In addition, in order to enable execution of the pattern plotting point by point, the position of the tire relative to the laser beam focus must be continuously adjusted by moving the support: since the machine is provided with bulky and solid movement members, the machine is slow and also expensive if a sufficient working precision is to be ensured; in spite of the above, the pattern thus achieved is not comparable from a qualitative point of view to those obtained through gouging and moulding, in particular due to the difficulty of executing sharp edges in the rib-block region, so that the tire is not adapted for executing some specific behavior tests.

SUMMARY OF THE INVENTION

According to the present invention, plotting of the trace pattern on a tire is drastically simplified with respect to the known art, by adopting a plotting member arranged to act on the radially external toroidal surface of the tire, oscillable within a cone of predetermined width about the perpendicular, at each point of said surface and causing, through control of an electronic computer, a relative movement between the plotting member and the tire being worked so that the trace pattern previously stored in the electronic computer itself is reproduced as a sum of distinct successive portions.

In one aspect the invention relates to a method for plotting a trace pattern on the tread band of a tire, comprising the steps of:

storing a base data sequence relative to a predetermined trace pattern in an electronic computers;

storing a detection data sequence in an electronic computer, which data correspond to the geometrical conformation and surface extension of the radially external surface of a tire being worked;

processing said base data sequence depending on said detection data sequence, so as to create an application data sequence corresponding to the trace pattern to be reproduced on said surfaces;

plotting said trace pattern on the radially external surface of the tire, as a sequential sum of a plurality of distinct elementary portions, through movement of a plotting means controlled by the electronic computer, based on said application data sequence, which means acts on said surface kept stationary during the plotting operation.

Conveniently, said plotting operation comprises the step of detecting the outer surface extension of the tire through a detection means directly connected to the same electronic computer driving the plotting means for transmitting to said computer the sequence of the detection data to be stored. In a preferred embodiment of the invention the plotting operation is carried out by a laser beam which is oscillated, through optical reflection means, within a cone in which the vertex is at the beam emitting point, the axis of symmetry is perpendicular to the axis of rotation of the tire, the height is the same as the distance of the emission point from the tire surface and the diameter of the base circle is not greater than 40 cm.

Advantageously, the intensity and oscillation speed of the laser beam are suitably checked during the plotting operation, so as to form three-dimension elements of the corresponding tread pattern in the thickness of said surface.

In particular, said base data sequence corresponds to a single elementary portion of the trace pattern to be reproduced and such elementary portion can be defined so that all elementary portions of the trace pattern are identical with each other.

It may be also provided that at least one of said elementary portions of the trace pattern should be divided into a series of two-dimension stratigrafies, each relating to a single focusing value of the laser beam.

In addition it is provided that in the shifting step of the plotting means between two positions of different focusing, any relative movements between the tire being worked and the plotting means be achieved by combining one rotation of the tire about its own axis of rotation with one angular oscillation of the tire about an auxiliary oscillation axis, perpendicular to said axis of rotation and at the level of said oscillation cone of the laser beam.

In a second aspect the invention also relates to an apparatus for plotting a trace pattern on the tread band of a tire, characterized in that it comprises:

a bearing structure for said tire provided with means for enabling the tire movement around at least one pair of axes perpendicular to each other and intersecting at the center of symmetry of the tire, one of said axes being the axis of rotation of the tire, and means for enabling displacement of the axis of rotation of the tire at least in a direction perpendicular to said axis of rotation;

at least one plotting instrument operatively connected to said bearing structure and arranged to act on the radially external surface of said tire for plotting a desired trace pattern thereon;

an electronic computer for:

storing a base data sequence relating to a predetermined trace pattern;

storing a detection data sequence corresponding to the geometrical conformation and surface extension of said surface;

processing said base data sequence depending on said detection data sequence, so as to create an application data sequence corresponding to the trace pattern to be reproduced on said surface;

driving said movement means for moving the tire as well as said plotting instrument in order to produce said trace pattern on the tread band.

In particular, the apparatus may comprise:

a fixed base;

a framework carrying a rotary support shaft in cantilevered fashion, which shaft is designed to operatively engage a rim with which a tire being worked is associated, for setting the tire in rotation about its own axis, said framework being mounted so that it rotates about a primary oscillation axis and an auxiliary oscillation axis, perpendicular to each other and to the axis of rotation;

movement means operating between the carrying framework and said support shaft and movement means operating between the framework and the fixed base for rotating said framework about said oscillation axes and displacing said axis of rotation according to at least one direction perpendicular to said axis of rotation.

Preferably, the apparatus further comprises a detection feeler element operatively supported by the fixed base and designed to act on the radially external toroidal surface of the tire in order to detect the geometrical conformation and surface extension of same; and said movement means comprises at least one stepping motor, one reduction gear operatively engaged with the stepping motor and one constant-torque motor, connected to the reduction gear, for eliminating the effects of mechanical backlashes of said reduction gear.

In accordance with another aspect of the present invention, said plotting means comprises a laser beam emitter operated by a system involving optical reflection means for oscillating said laser beam within a cone in which the vertex is at the emission point of said beam and the axis of symmetry is perpendicular to said axis of rotation or, preferably, coinciding with said primary oscillation axis.

Advantageously, said cone at the focal point of the laser beam should have a diameter of the base circle not higher than 40 cm.

It is also provided that said optical deflection means system should enable the intensity and oscillation speed of the laser beam to be adjusted during the plotting operation, so that at least in the thickness of said tread band three-dimension elements of the corresponding tread pattern can be formed and possibly even the whole track pattern, thereby eliminating the necessity to carry out gouging.

BRIEF DESCRIPTION OF THE DRAWINGS

Further features and advantages will become more apparent from the detailed description of a preferred embodiment of a method for plotting a trace pattern on a tread band of a tire, and an apparatus for putting said method into practice, in accordance with the present invention. Such a description is given hereinafter, byway of non-limiting example, with reference to the accompanying drawings, in which.

DETAILED DESCRIPTION OF A PREFERRED EMBODIMENT

Figure 1:
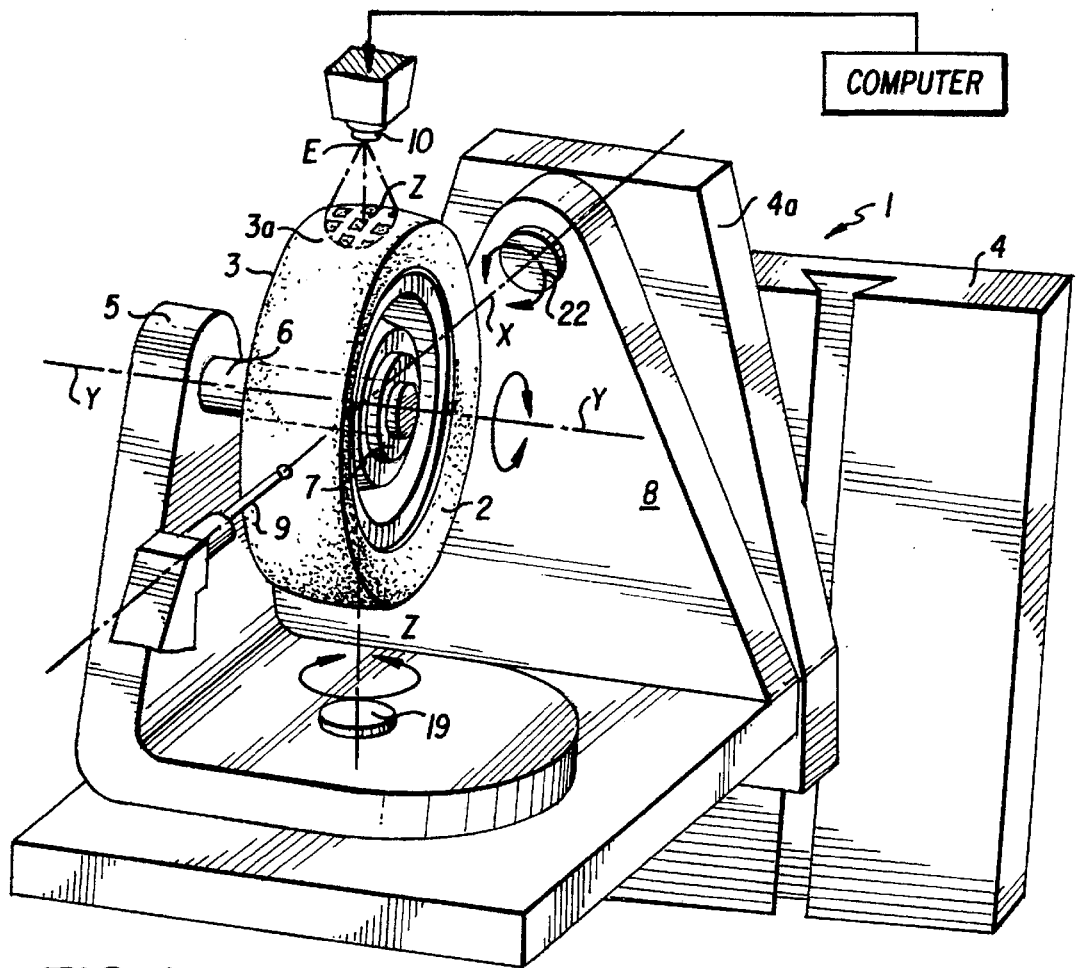
FIG. 1 is a diagrammatic perspective view of the apparatus according to the present invention.

With reference to the drawings, an apparatus for plotting a trace pattern on the tread band of a tire in accordance with the present invention has been generally identified by reference numeral 1.

In greater detail, the apparatus 1 operates on a tire 2 provided with a tread band 3 and already submitted to a conventional vulcanization cycle, the outer toroidal surface 3a of which is smooth, is designed to be further processed for the formation of a given tread pattern on said band.

The apparatus is designed to plot a trace pattern on said tire surface 3a; based on said pattern a final three-dimension pattern, in particular by gouging, will be then formed: on the other hand, as explained in the following, alternatively such a final pattern can be also formed through an appropriate use of the plotting instrument itself.

Figure 2:
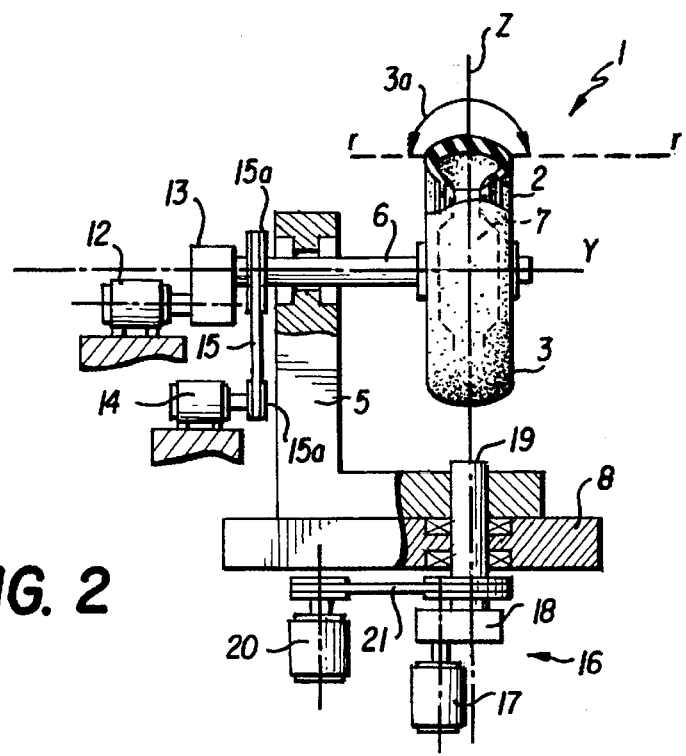
FIG. 2 is a front elevation of the apparatus of FIG. 1 and laterally shows that apparatus in partial section, diagrammatically highlighting part of the movement means associated with the apparatus.

It is to be noted that the surface 3a concerned with working can extend axially (FIG. 2) past the tread ends on the tire sidewall portions at a position radially external to the maximum chord, that is the reference line r that in the right section identifies the maximum tire width.

For the purpose, the apparatus interlocked to an electronic control computer, enables the tire movement about at least one pair of axes perpendicular to each other, preferably intersecting at the center of symmetry of the tire rotating about one of said axes: in order that the apparatus may operate on tires of any diameters, at least one relative translation between the axis of rotation of the tire and the plotting instrument is provided in a direction perpendicular to said axis of rotation.

By way of example and only for the purpose of completeness, taking into account the variety of possible alternative embodiments, the apparatus 1 as herein described comprises a fixed base 4 on which a carrying plate 4a is slidably mounted, for example for upward or downward movement, which plate is in turn operatively connected to a framework 5 carrying a support shaft 6 in a cantilevered fashion and rotating about an axis of rotation "Y"; mounted to one end of said shaft is a conventional rim 7 arranged to operatively engage the tire 2 in an inflated condition.

Preferably, the framework 5 is rotatably linked by pin 19, about a primary oscillation axis "Z" perpendicular to the axis of rotation "Y", to a support frame 8 which in turn is linked through pin 22 to the carrying plate 4a with the possibility of rotation about an auxiliary oscillation axis "X" perpendicular to said rotation and oscillation axes, "Y" and "Z" respectively.

The apparatus further comprises a plotting instrument 10, hung to the fixed base 4 in any manner and therefore not shown, which is adapted to act on the outer toroidal surface 3a of the tire preferably according to a direction lying in a plane common to the axis of rotation "Y", at right angles to the axis itself, in a neighborhood of a predetermined amplitude about said direction.

In particular, in the example shown the plotting instrument 10 essentially consists of a laser beam emitter the beam of which, deviated by optical means known per se and conventional to be activated upon command of the electronic computer as well, is guided so as to plot a predetermined elementary portion of the trace pattern on the tire surface 3a to be worked.

In a convenient embodiment, said laser beam produced by the emitter moves on the tire surface within a cone in which: the vertex is at the beam emission point E, the axis of symmetry coinciding with the primary oscillation axis Z, the height corresponds to the distance of E from the tire surface, and the base diameter is equal to 40 cm.

Within this range, in fact, the distance variation between the point E and the impact point of the laser beam on the tire surface does not, to the ends of the present invention, greatly change the correct focal distance of the beam, equal to said height.

In the remainder of the present description it is considered that the emission point of the laser beam is the final reflection point of the beam, that is point E (FIG. 1) in which the beam is directly projected onto the tire surface from the last mirror of the optical reflection system.

The apparatus may also be comprised of a detection system adapted to determine the exact tire size, such as for example, in the solution shown, a feeler element 9 of a ball-shaped type, commonly available on the market and therefore not described or shown in detail. As clearly discernible from FIG. 1, the feeler element or feeler ball 9 is adapted to act on the tire surface 3a preferably according to a direction perpendicular to the axis of rotation "Y" and coinciding, in the example shown, with the auxiliary oscillation axis "X".

Movement means are suitably provided for acting between the different bearing frameworks, for the purpose of driving the tire in rotation about its own axis coinciding with axis Y, rotating the tire about the oscillation axes X and Z and displacing the rotation axis of the tire in the two ways, in the direction of the emitter 10.

Of course, one or more relative movements between the tire and plotting instrument can be obtained by causing movement of the instrument relative to the tire: it is apparent that in this case the apparatus will be different from the one herein shown, although it is included within the scope of the present invention as well.

Said movement means (only means 11 and means 16 are partly shown in FIG. 2, the former acting between the primary carrying framework 5 and the support shaft 6 for setting the tire in rotation about its own axis, the latter acting between the primary carrying framework 5 and the support frame 8 for rotating the tire tread band relative to the plotting instrument 10 according to axis Z) preferably comprise stepping motors 12, 17 operating through reduction gears 13, 18, for example of the epicycloidal type, as well as constant-torque motors 14, 20 connected through transmission means 15 (and pulley 15a) and 21 respectively to said shaft 6 and pin 19, for the purpose of enabling gradual tire displacements of a reduced width: all such movement means are of a well-known type and therefore are not further described.

Finally, associated with the apparatus 1 is an electronic computer, already mentioned and conventional, designed to receive and store all necessary data and manage all steps of the pattern plotting process in reference.

In greater detail, by adopting a plotting method according to the present invention, stored in the electronic computer is first of all a sequence of "base data" relating to the trace pattern to be made on the toric tire surface 3a. Conveniently, the base data sequence does not describe the whole trace pattern to be reproduced on the surface 3a, but only a limited portion thereof, preferably that of a module or circumferential sector that lends itself to be sequentially repeated several times, always identical to itself, to give origin to a complete trace pattern.

Alternatively, several base data sequences relating to the same pattern can be stored, the sum of which sequentially repeated along the axial and/or circumferential extensions of the tire, will be the source of a complete pattern.

In this case each base data sequence corresponds to a different pattern portion of predetermined width; in any case said portions will be hereinafter referred to as elementary portions of the trace pattern.

Obviously, several base sequences to be selectively used for achieving different trace patterns can be stored in the electronic computer.

The computer is also arranged to receive a sequence of "detection data" relating to the size extension and geometrical configuration of the radially external toroidal surface 3a of the tire.

As already said, such data can be detected and sent to the electronic computer by any detecting device suitable for the purpose, either of the mechanical type or of the electronic type or of another type not necessarily connected to the inventive apparatus; in addition detection of said data may be carried out even during any working step preceding plotting of the trace pattern but not sequentially connected thereto.

By way of example only and for the purpose of completeness, in the case herein described the use of the above mentioned mechanical feeler ball 9 has been assumed.

Ultimately, also stored in the electronic computer are all data relating to the actuation of all steps of the plotting process: consequently, the electronic computer is arranged to control operation of the above movement means for the tire, movement system for the laser plotter 10 and, if present, movement and detection means for the feeler ball according to a predetermined operating sequence, so that a determined complete plotting program is formed for reproducing the desired trace pattern on the toric surface 3a of the tire itself.

In addition, for the purpose of highlighting the trace pattern that is going to be plotted on the tire, said tire can be previously submitted to a painting step to be executed on surface 3a with a contrast paint adapted to be removed by the laser beam: alternatively, other contrast methods may be used, such as painting with a penetrating paint applied subsequently to the pattern plotting.

Obviously, it is also possible to renounce highlighting of the pattern, in that the laser beam by itself emphasizes the pattern and in addition the laser beam may be also used as a gouging means for cutting the provided pattern directly in the tread and sidewall thicknesses, which pattern in this case will not be a trace pattern any longer, but a final or track pattern.

The following description refers to a specific but not exclusive plotting program using the feeler ball 9.

The tire being worked 2 is first of all mounted to the rim 7 and inflated to a predetermined use pressure.

Subsequently, the detection feeler ball 9 is activated so as to act on the tread band 3 and detect the geometrical size features of which while the tire 2, through the movement means 11, is driven in rotation about its own axis. In this manner the detection feeler ball 9 detects the exact circumferential extension of the surface 3a in the tread band 3 at a given point of the axial extension thereof, for example coinciding with the equatorial plane of the tire. Following one or more angular oscillations of the primary carrying framework 5 about the oscillation axis "Z", the exact width of the surface 3a is detected still by the feeler ball 9, together with other geometrical features of said surface, such as for example the curvature of its profile in cross-section.

The detections carried out by the feeler ball 9 give rise to a sequence of "detection data" which is transmitted to the electronic computer. Based on this detection data sequence, the electronic computer carries out processing of the base data sequence relating to the elementary portion of the pattern to be reproduced.

In this detection the execution of an adjustment of the base data sequence is provided until the elementary pattern portion represented by it corresponds in size to the corresponding real portion of the tire surface, for example the exact width of surface 3a, or a submultiple integer thereof, as well as a submultiple integer of the circumferential extension of the surface itself.

Adjustment of the base data sequence is repeated a number of times sufficient to enable the sum of the overall extension of the obtained elementary pattern portions to exactly coincide with the overall extension of the surface 3a.

In conclusion, the above described processing is the source of a plurality of "application data" sequences to which the exact trace pattern to be reproduced on the surface 3a corresponds.

It is apparent that the number of base data sequences to be processed increases as the area of the elementary pattern portion connected to each sequence decreases, and therefore very long processing times are required for trace patterns divided into many pieces, so that it is important to enlarge said area of the elementary portion as much as possible in order to be able to reduce the number of the elementary portions to be plotted.

On the other hand, the increase of said area produces surfaces having an important curvature, in particular a double curvature, that is both in the circumferential and axial directions, above all for the elementary pattern portions corresponding to the tire shoulder and sidewall areas.

Due to this curving a continuous focusing of the laser beam is required in order to ensure an excellent action of the laser beam on varying of the distance between the emission point and impact point of the laser beam onto the surface 3a. This focusing was usually achieved with a continuous movement of the tire: however, as already pointed out, this continuous variation in the beam focusing involves several operating drawbacks.

In accordance with the invention, the application data sequence relating to each elementary pattern portion to be reproduced is divided into a series of two-dimension stratigrafies, each restricted to an area inscribable in a circle with a diameter of 40 cm forming the base of the oscillation cone of the laser beam, and therefore relating to a single focusing value of the beam.

Based on the application data sequence relating to each stratigrafy, the computer activates the emission of the laser beam and controls oscillations thereof in the assigned hunting cone by means of the already mentioned optical reflection system, so as to plot all elements of the stratigrafy while keeping the tire stationary relative to the three axes X, Y, Z, as well as translation with respect to the emitter 10.

The beam oscillation for subsequent stratigrafies enables the elementary portion of the trace pattern to be plotted on the surface 3a of the tire; width and depth of the marks are imposed by controlling the intensity and oscillation speed of the beam.

It is apparent that an appropriate selection of these values enables particular three-dimension elements of the pattern (cuts and sipes) to be directly formed on the tire, which elements can be hardly formed by a gouging operation or sometimes their formation is even impossible by gouging due to their small geometrical sizes: obviously by this system it is also possible to obtain the whole three-dimension pattern.

After a stratigrafy has been carried out, the movement means for moving the tire about said three axes is activated in the sense that a new stratigrafy is brought close to the plotter 10 for carrying out a new portion of the trace pattern until the whole pattern has been reproduced on the whole surface 3a of the tire being worked.

The present invention achieves important advantages.

The plotting method in accordance with the present invention, in fact, greatly simplifies plotting of the trace pattern as compared with the known methods based on the manufacture and use of metal masks.

In particular the time necessary for carrying out the preliminary operations for making slits in the mask is eliminated, which operations, among other things, need the use of skilled and expensive manpower.

Also eliminated are all the problems connected with the impossibility of making a mask exactly corresponding with the trace pattern to be achieved in order not to be obliged to cut the mask itself into small pieces.

It will be also recognized that by the present invention, due to the size detection carried out on the tire before plotting, the trace pattern perfectly fit the actual circumferential extension of the tread bands on the contrary, with the use of masks, the unavoidable differences between the circumferential extension and the nominal value involved serious problems in terms of obtaining a perfectly uniform pattern.

In addition, the use of the electronic computer for storing and processing data relating to the trace pattern, as well as executing the pattern itself, ensures a much more precise execution than with the use of hand-made masks and manual painting with the aid of said masks.

The use of an oscillating laser beam enables the speed in making the trace pattern to be increased and said pattern to be reproduced through a sequence of elementary portions, each made while the tire is stationary: as a result, a very high precision is achieved and the tire movement can be of the macrometric type instead of being of the micrometric types therefore said movement can be executed more easily as less precision is required as well as less complicated and less expensive movement means.

In particular, since the continuous variation in focusing has been replaced by a sequence of different focusings in succession, the plotting system is more reliable and precise and the quality of the pattern reproduced on the tire is improved, in particular as regards the direct execution by a laser beam of three-dimension elements of the tread pattern.

Obviously many modifications and variations may be made to the invention as conceived, all of them falling within the scope of the invention as characterized in the appended claims.

We claim:

1. A method for plotting a trace pattern on the tread band of a tire, comprising the steps of:

storing a base data sequence relative to a predetermined trace pattern in an electronic computer;

storing a detection data sequence in the electronic computer, which data correspond to the geometrical conformation and surface of the radially external surface of a tire;

processing said base data sequence depending on said detection data sequence, so as to create an application data sequence corresponding to the trace pattern to be reproduced on said tire surface;

plotting said trace pattern on the radially external surface of the tire, as a sequential sum of a plurality of distinct elementary portions, through movement of a laser beam controlled by the electronic computer, based on said application data sequence, said laser beam plotting a predetermined elementary portion of said trace pattern by oscillating on said tire surface within a cone of predetermined width in which a vertex of said laser beam is at the laser beam emitting point and an axis of symmetry thereof is perpendicular to an axis of rotation of the tire, a focal distance of said laser beam being the distance of the emitting point from the tire surface.

2. A method according to claim 1 in which said plotting operation comprises the step of detecting the outer surface of the tire through a detection means directly connected to the electronic computer which is driving the laser beam for transmitting to said computer the sequence of the detection data to be stored.

3. A method for plotting a trace pattern on the tread band of a tire, comprising the steps of:

storing a base data sequence relative to a predetermined trace pattern in an electronic computer;

storing a detection data sequence in the electronic computer, which data correspond to the geometrical conformation and surface of the radially external surface of a tire;

processing said base data sequence depending on said detection data sequence, so as to create an application data sequence corresponding to the trace pattern to be reproduced on said tire surface;

plotting said trace pattern by a laser beam on the radially external surface of the tire, as a sequential sum of a plurality of distinct elementary portions, through movement of the laser beam controlled by the electronic computer, based on said application data sequence, said plotting operation comprises the step of detecting the outer surface of the tire through a detection means directly connected to the electronic computer which is driving the laser beam for transmitting to said computer the sequence of the detection data to be stored, said method further including oscillating said laser beam, through optical reflection means, within a cone in which the vertex is at the beam emitting point, the axis of symmetry is perpendicular to the axis of rotation of the tire, the height of the cone being the same as the distance of the emission point from the tire surface and the diameter of the base circle of the cone is not greater than 40 cm.

4. A method according to claim 3 including checking the intensity and oscillation speed of the laser beam during the plotting operation, so as to form three-dimension elements of the corresponding tread pattern in the thickness of said surface.

5. A method for plotting a trace pattern on the tread band of a tire, comprising the steps of:

storing a base data sequence relative to a single elementary portion of a trace pattern in an electronic computer;

storing a detection data sequence in the electronic computer, which data correspond to the geometrical conformation and surface of the radially external surface of a tire;

processing said base data sequence depending on said detection data sequence, so as to create an application data sequence corresponding to the trace pattern to be reproduced on said tire surface;

plotting said trace pattern on the radially external surface of the tire, as a sequential sum of a plurality of distinct elementary portions, through movement of a laser beam controlled by the electronic computer, based on said application data sequence;

dividing at least one of said elementary portions of the trace pattern into a series of two-dimension stratigrafies, each relating to a single focusing value of the laser beam.

6. A method according to claim 5 for which such elementary portions of the trace pattern are identical with each other.

7. A method according to claim 6 in which in a shifting step of the laser beam between two positions of different focusing, any relative movements between the tire being worked and the plotting means is achieved by combining one rotation of the tire about its own axis of rotation with one angular oscillation of the tire about an auxiliary oscillation axis, perpendicular to said axis of rotation and the axis of symmetry of said oscillation cone of the laser beam.

8. An apparatus for plotting a trace pattern on the tread band of a tire comprising:

a bearing structure for said tire provided with means for enabling tire movement around at least one pair of axes perpendicular to each other and intersecting at the center of symmetry of the tire, one of said axes being the axis of rotation of the tire, and means for enabling displacement of the axis of rotation of the tire at least in a direction perpendicular to said axis of rotation;

at least one plotting instrument operatively connected to said bearing structure and arranged to act on the radially external surface of said tire for plotting a desired trace pattern thereon;

an electronic computer means for:
(a) storing a base data sequence relating to a predetermined trace pattern;
(b) storing a detection data sequence corresponding to the geometrical conformation and surface extension of said tire surface;
(c) processing said base data sequence depending on said detection data sequence, so as to create an application data sequence corresponding to the trace pattern to be reproduced on said tire surfaces;
(d) driving said movement means for moving the tire as well as said plotting instrument in order to produce said trace pattern on said tire surface.

9. An apparatus according to claim 8 in which said bearing structure for said tire comprises:

a fixed base;

a framework carrying a rotary support shaft in cantilevered fashion for operatively engaging a rim for carrying a tire and for rotating the tire about its own axis, said framework being rotatably mounted on said base about a primary oscillation axis and an auxiliary oscillation axis, said axes being perpendicular to each other and to the axis of rotation;

first movement means operating between the carrying framework and said support shaft and second movement means operating between the framework and the fixed base for rotating said framework about said oscillation axes and displacing said axis of rotation according to at least one direction perpendicular to said axis of rotation.

10. An apparatus according to claim 8 in which said bearing structure comprises:

at least one detection feeler element operatively supported by the fixed base for acting on the radially external toroidal surface of the tire so as to detect the geometrical conformation and surface extension of said tire surface.

11. An apparatus according to claim 8 said first and second movement means comprises at least one stepping motor, one reduction gear operatively engaged with the stepping motor and one constant-torque motor, connected to the reduction gear, for eliminating the effects of mechanical backlashes of said reduction gear.

12. An apparatus according to claim 8 in which said plotting element comprises a laser beam emitter operated by a system involving optical reflection means for oscillating said laser beam within a cone in which the vertex is at the emission point of said beam and the axis of symmetry is perpendicular to said tire axis of rotation.

13. An apparatus according to claim 12 in which said axis of symmetry coincides with said primary oscillation axis.

14. An apparatus according to claim 12 in which said cone at the focal point of the laser beam has a base circle diameter not greater than 40 cm.

15. An apparatus according to claim 12 in which said optical deflection means system has means to enable the intensity and oscillation speed of the laser beam to be adjusted during the plotting operation, so that at least in the thickness of said tread band, three-dimension elements of the corresponding tread band pattern are formed.

16. A method according to claim 1 in which the base of said cone on the tire surface is a circle having a diameter not greater than 40 cm.

17. A method according to claim 1 including keeping said tire surface stationary during said plotting operation.

* * * * *